United States Patent
Luo et al.

(10) Patent No.: US 8,514,721 B2
(45) Date of Patent: Aug. 20, 2013

(54) ROBUST UE RECEIVER

(75) Inventors: Tao Luo, San Diego, CA (US); Durga Prasad Malladi, San Diego, CA (US); Juan Montojo, San Diego, CA (US); Nathan Edward Tenny, Poway, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 577 days.

(21) Appl. No.: 12/816,102

(22) Filed: Jun. 15, 2010

(65) Prior Publication Data

US 2011/0141901 A1 Jun. 16, 2011

Related U.S. Application Data

(60) Provisional application No. 61/219,296, filed on Jun. 22, 2009.

(51) Int. Cl.
*H04L 12/26* (2006.01)

(52) U.S. Cl.
USPC ........ 370/241; 370/336; 370/395.4; 370/442; 375/299; 714/748

(58) Field of Classification Search
USPC ................. 370/241–251, 328–342, 280, 312; 714/748, 751; 375/299
See application file for complete search history.

(56) References Cited

U.S. PATENT DOCUMENTS

| | | | |
|---|---|---|---|
| 7,761,767 B2 * | 7/2010 | Chandra et al. ............... | 714/751 |
| 2008/0080424 A1 * | 4/2008 | Torsner et al. ................ | 370/330 |
| 2009/0040976 A1 * | 2/2009 | Kim et al. ..................... | 370/329 |
| 2009/0103500 A1 * | 4/2009 | Malkamaki et al. .......... | 370/336 |
| 2009/0207771 A1 * | 8/2009 | Lindskog et al. ............. | 370/312 |
| 2009/0304109 A1 * | 12/2009 | Kotecha ........................ | 375/299 |
| 2009/0323564 A1 * | 12/2009 | Chiu .............................. | 370/280 |
| 2010/0325503 A1 * | 12/2010 | Womack et al. .............. | 714/748 |
| 2011/0047430 A1 * | 2/2011 | Feuersanger et al. ......... | 714/748 |
| 2011/0205996 A1 * | 8/2011 | Kim et al. ..................... | 370/329 |
| 2011/0211522 A1 * | 9/2011 | Chung et al. .................. | 370/315 |
| 2012/0275440 A1 * | 11/2012 | Park et al. ..................... | 370/336 |

OTHER PUBLICATIONS

An efficient and robust HARQ-ARQ interaction 3GPP Draft; R2-061698 An Efficient and Robust HARQ-ARQ Interaction V1, 3rd Generation Partnership Project (3GPP), Mobile Competence Centre ; 650, Route Des Lucioles ; F-06921 Sophia-Antipolis Cedex ; France, v.

(Continued)

*Primary Examiner* — Michael Thier
*Assistant Examiner* — Vincelas Louis
(74) *Attorney, Agent, or Firm* — Nerrie M. Zohn

(57) ABSTRACT

Methods, systems, apparatus and computer program products are provided to improve the reliability of data reception. In one provided embodiment, a communication signal is parsed by a communication device to identify repeat request identifiers. The device determines an inter-arrival time of two instances of the same identifier and processes the communication signal based on a comparison between the inter-arrival time and a predetermined time. This Abstract is provided for the sole purpose of complying with the Abstract requirement rules that allow a reader to quickly ascertain the disclosed subject matter. Therefore, it is to be understood that it should not be used to interpret or limit the scope or the meaning of the claims.

18 Claims, 11 Drawing Sheets

(56) References Cited

OTHER PUBLICATIONS

International Search Report and Written Opinion—PCT/US2010/039528, International Search Authority—European Patent Office—Sep. 23, 2010.

Siemens: "E-DCH—Comparison of process modes for HARQ" 3GPP Draft; R2041589—E-DCH—Comparison of Process Modes for HARQ, 3rd Generation Partnership Project (3GPP), Mobile Competence Centre ; 650, Route Des Lucioles ; F-06921 Sophia-Antipolis Cedex.

* cited by examiner

ROBUST UE RECEIVER

The present application claims priority to U.S. Provisional Patent Application Ser. No. 61/219,296, entitled "Robust UE Receiver," filed Jun. 22, 2009, the entirety of which is hereby incorporated by reference.

FIELD OF INVENTION

The present invention relates generally to the field of wireless communications and, more particularly to improving the reliability and throughput of data reception in a wireless communication link.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Modern wireless communication systems use a variety of methods to determine that transmitted data is received correctly, and to provide for the retransmission of data when reception errors occur. For example, in 3GPP Long Term Evolution (LTE) Release 8 (Rel-8), a hybrid automatic repeat request (HARQ) methodology uses asynchronous automatic repeat request (ARQ) with soft combining, where erroneously decoded data packets are stored in a buffer memory and selectively combined with retransmitted data packets.

A HARQ process is a stop and wait construct. To allow for continuous transmission to a single mobile station (user equipment, or UE), multiple HARQ processes are operated in parallel. For each UE, there is one HARQ entity consisting of multiple HARQ processes. LTE Rel-8 specifies eight (8) HARQ processes in the downlink when operating in frequency division duplex (FDD) mode, with 8 different HARQ process numbers (HARQ IDs), based on an assumption about the round trip time between a base station (evolved Node B or eNode B) and a UE, including their respective processing times. When the operation is in time division duplex (TDD) mode, the number of HARQ processes in the downlink may vary between 4 and 15 depending on the downlink-uplink allocation schedule. In LTE Rel-8, each transport block (sub-frame) associated with a HARQ ID has a duration of 1 millisecond. Therefore, the time interval between the transmission of two transport blocks with the same HARQ ID cannot be less than 8 milliseconds in FDD mode.

If a UE receiver detects a reception error in a data block with a particular HARQ ID, and sends a repeat request (negative acknowledgement, or NACK) to the base station, the receiver expects to receive a data retransmission with the same HARQ ID no earlier than 8 ms after the original data block was received. Similarly, if the UE receiver decodes a data block without error and sends an acknowledgement (ACK) to the base station for the HARQ ID associated with the data, the receiver expects new data with the same HARQ ID no earlier than 8 ms after the first data block was received. However, there is a finite probability that a decoding error at the UE receiver can erroneously decode any transmission inside the 8 ms interval as a repeat of the particular HARQ ID. Existing LTE Rel-8 systems have no provision for handling such decoding anomalies and are subject to corruptions of the HARQ buffer or system crashes if the same HARQ ID is decoded twice in a time interval that is less than 8 ms. Additionally, there is no provision in LTE Rel-8 for negotiation between the base station and the UE to reduce the time interval if the UE has enhanced processing capability.

SUMMARY

The disclosed embodiments relate to systems, methods, apparatus and computer program products that increase the reliability and throughput of wireless data transmissions between a mobile receiver and a base station in a wireless communication system. To this end, according to the various embodiments, a receiver is configured to selectively process anomalous data identifiers and to negotiate data processing intervals with the base station.

According to one embodiment, a method includes parsing a communication control signal in a communication device to identify repeat request identifiers, determining an inter-arrival time comprising a time interval between a first instance of a repeat request identifier and a second instance of the same repeat request identifier, and processing the communication control signal based on a comparison of the inter-arrival time to a predetermined inter-arrival time including a minimum time interval between the first instance of the repeat request identifier and the second instance of the same repeat request identifier.

In one embodiment, the method further includes processing the communication control signal based on a comparison of the inter-arrival time to a processing time in the communication device.

In one aspect of the method, the processing includes a processing technique such as acknowledging and processing data associated with the first instance of the repeat request identifier and ignoring data associated with the second instance of the repeat request identifier, acknowledging and processing the data associated with the second instance of the repeat request identifier and ignoring the data associated with the first instance of the repeat request identifier, requesting retransmission of the data associated with the first instance of the repeat request identifier or the data associated with the second instance of the repeat request identifier, and combining the data associated with the second instance of the repeat request identifier with data associated with the first instance of the repeat request identifier.

In one aspect of the method, the predetermined inter-arrival time interval is negotiated between a base station and the communication device based on a processing capacity of the communication device. In one embodiment, the predetermined inter-arrival time is less than 8 milliseconds.

In one aspect of the method, the control signal includes a physical downlink control channel (PDCCH) signal in a third generation partnership project (3GPP) long term evolution (LTE) network.

In one aspect of the method, the repeat request identifier comprises a hybrid automatic repeat request (HARQ) process identifier (ID) in a 3GPP LTE network.

In one provided embodiment, a communication device includes a processor and a memory that contains processor executable instructions that, when executed by the processor, configures the apparatus to parse a communication control signal to identify repeat request identifiers, determine an inter-arrival time comprising a time interval between a first instance of a repeat request identifier and a second instance of the same repeat request identifier, and process the communication signal in response to a comparison of the inter-arrival time to a predetermined inter-arrival time, the predetermined inter-arrival time comprising a minimum time interval between the first instance of the repeat request identifier and the second instance of the repeat request identifier.

In another embodiment, a communication device includes a processor and a memory that contains processor executable instructions that, when executed by the processor, further configures the apparatus to process the communication control signal based on a comparison of the inter-arrival time to a processing time in the communication device.

In one aspect of the communication device, the process includes a processing technique such as acknowledging and processing data associated with the first instance of the repeat request identifier and ignoring data associated with the second instance of the repeat request identifier, acknowledging and processing the data associated with the second instance of the repeat request identifier and ignoring the data associated with the first instance of the repeat request identifier, requesting retransmission of the data associated with the first instance of the repeat request identifier or the data associated with the second instance of the repeat request identifier, and combining the data associated with the second instance of the repeat request identifier with data associated with the first instance of the repeat request identifier.

In one aspect of the communication device, the predetermined inter-arrival time interval is negotiated between a base station and the communication device based on a processing capacity of the communication device.

In one aspect of the communication device, the predetermined inter-arrival time is less than 8 milliseconds.

In one aspect of the communication device, the control signal comprises a physical downlink control channel (PD-CCH) signal in a third generation partnership project (3GPP) long term evolution (LTE) network.

In one aspect of the communication device, the repeat request identifier comprises a hybrid automatic repeat request (HARQ) process identifier (ID) in a 3GPP LTE network.

In another embodiment, a computer program product, embodied on a computer-readable medium, is provided. The computer program product includes program code for parsing a communication control signal in a communication device to identify repeat request identifiers, program code for determining an inter-arrival time comprising a time interval between a first instance of a repeat request identifier and a second instance of the repeat request identifier, and program code for processing the communication control signal based on a comparison of the inter-arrival time to a predetermined inter-arrival time comprising a minimum time interval between the first instance of the repeat request identifier and the second instance of the repeat request identifier.

In one embodiment, the computer program product further includes program code for processing the communication control signal based on a comparison of the inter-arrival time to a processing time in the communication device.

In one embodiment, the computer program product further includes program code for selecting the processing that includes a processing technique such as acknowledging and processing data associated with the first instance of the repeat request identifier and ignoring data associated with the second instance of the repeat request identifier, acknowledging and processing the data associated with the second instance of the repeat request identifier and ignoring the data associated with the first instance of the repeat request identifier, requesting retransmission of the data associated with the first instance of the repeat request identifier or the data associated with the second instance of the repeat request identifier, and combining the data associated with the second instance of the repeat request identifier with data associated with the first instance of the repeat request identifier.

In one embodiment, the computer program product further includes program code for negotiating the predetermined inter-arrival time interval between a base station and the communication device based on a processing capacity of the communication device.

In one aspect of the computer program product, the predetermined inter-arrival time is less than 8 milliseconds.

In one aspect of the computer program product, the control signal comprises a physical downlink control channel (PD-CCH) signal in a third generation partnership project (3GPP) long term evolution (LTE) network.

In one aspect of the computer program product, the repeat request identifier comprises a hybrid automatic repeat request (HARQ) process identifier (ID) in a 3GPP LTE network.

In one embodiment, a communication device includes means for parsing a communication control signal in a communication device to identify repeat request identifiers, means for determining an inter-arrival time comprising a time interval between a first instance of a repeat request identifier and a second instance of the repeat request identifier and means for processing the communication control signal based on a comparison of the inter-arrival time to a predetermined inter-arrival time comprising a minimum time interval between the first instance of the repeat request identifier and the second instance of the repeat request identifier.

In one embodiment, the communication device further includes means for selecting a process based on a comparison of the inter-arrival time to a processing time in the communication device.

In one embodiment, the communication device further includes means for selecting a process based on a comparison of the inter-arrival time to a predetermined inter-arrival time comprising a minimum time interval between the first instance of the repeat request identifier and the second instance of the repeat request identifier.

In one embodiment, the communication device further includes means for negotiating the predetermined inter-arrival time between a base station and the communication device based on a processing capacity of the communication device.

In one aspect of the communication device, the predetermined inter-arrival time is less than 8 milliseconds.

In one aspect of the communication device, the control signal comprises a physical downlink control channel (PD-CCH) signal in a third generation partnership project (3GPP) long term evolution (LTE) network.

In one aspect of the communication device, the repeat request identifier comprises a hybrid automatic repeat request (HARQ) process identifier (ID) in a 3GPP LTE network.

These and other features of various embodiments, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

Provided embodiments are illustrated by way of example, and not of limitation, in the figures of the accompanying drawings in which.

DETAILED DESCRIPTION

Figure 1:
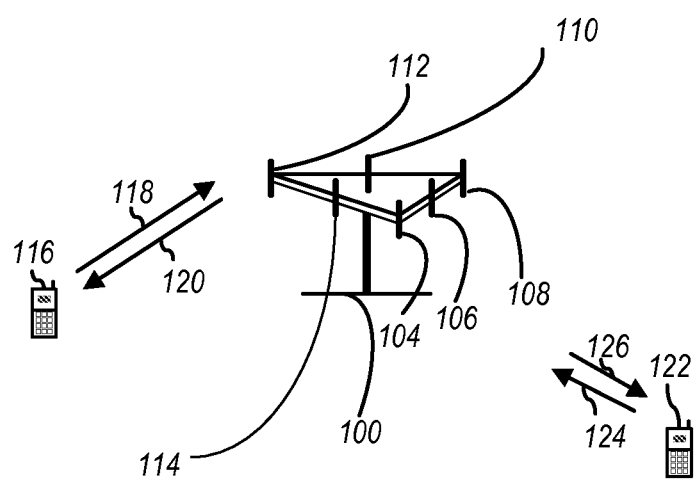
FIG. 1 illustrates a wireless communication system.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, Node B, evolved NodeB (eNB) or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 illustrates a wireless communication system within which the various disclosed embodiments may be implemented. A base station 100 may include multiple antenna groups, and each antenna group may comprise one or more antennas. For example, if the base station 100 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

Referring back to FIG. 1, a first user equipment 116 is illustrated to be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the third antenna 108 and the fourth antenna 110 to enable the transmission of information to the second user equipment 122 over a second forward link 126, and the reception of information from the second user equipment 122 over a second reverse link 124. In a Frequency Division Duplex (FDD) system, the communication links 118, 120, 124 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector of the base station. For example, the different antenna groups that are depicted in FIG. 1 may be designed to communicate to the user equipment in a sector of the base station 100. In communication over the forward links 120 and 126, the transmitting antennas of the base station 100 utilize beamforming in order to improve the signal-to-noise ratio of the forward links for the different user equipment 116 and 122. Also, a base station that uses beamforming to transmit to user equipment scattered randomly throughout its coverage area causes less interference to user equipment in the neighboring cells than a base station that transmits omni-directionally through a single antenna to all its user equipment.

The communication networks that may accommodate some of the various disclosed embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Further, the following terminology and features may be used in describing the various disclosed embodiments:

| | |
|---|---|
| 3G | 3rd Generation |
| 3GPP | 3rd Generation Partnership Project |
| ACLR | Adjacent channel leakage ratio |
| ACPR | Adjacent channel power ratio |
| ACS | Adjacent channel selectivity |
| ADS | Advanced Design System |
| AMC | Adaptive modulation and coding |
| A-MPR | Additional maximum power reduction |
| ARQ | Automatic repeat request |
| BCCH | Broadcast control channel |
| BTS | Base transceiver station |
| CDD | Cyclic delay diversity |

-continued

| | |
|---|---|
| CCDF | Complementary cumulative distribution function |
| CDMA | Code division multiple access |
| CFI | Control format indicator |
| Co-MIMO | Cooperative MIMO |
| CP | Cyclic prefix |
| CPICH | Common pilot channel |
| CPRI | Common public radio interface |
| CQI | Channel quality indicator |
| CRC | Cyclic redundancy check |
| DCI | Downlink control indicator |
| DFT | Discrete Fourier transform |
| DFT-SOFDM | Discrete Fourier transform spread OFDM |
| DL | Downlink (base station to subscriber transmission) |
| DL-SCH | Downlink shared channel |
| DSP | Digital signal processing |
| DT | Development toolset |
| DVSA | Digital vector signal analysis |
| EDA | Electronic design automation |
| E-DCH | Enhanced dedicated channel |
| E-UTRAN | Evolved UMTS terrestrial radio access network |
| eMBMS | Evolved multimedia broadcast multicast service |
| eNB | Evolved Node B |
| EPC | Evolved packet core |
| EPRE | Energy per resource element |
| ETSI | European Telecommunications Standards Institute |
| E-UTRA | Evolved UTRA |
| E-UTRAN | Evolved UTRAN |
| EVM | Error vector magnitude |
| FDD | Frequency division duplex |
| FFT | Fast Fourier transform |
| FRC | Fixed reference channel |
| FS1 | Frame structure type 1 |
| FS2 | Frame structure type 2 |
| GSM | Global system for mobile communication |
| HARQ | Hybrid automatic repeat request |
| HDL | Hardware description language |
| HI | HARQ indicator |
| HSDPA | High speed downlink packet access |
| HSPA | High speed packet access |
| HSUPA | High speed uplink packet access |
| IFFT | Inverse FFT |
| IOT | Interoperability test |
| IP | Internet protocol |
| LO | Local oscillator |
| LTE | Long term evolution |
| MAC | Medium access control |
| MBMS | Multimedia broadcast multicast service |
| MBSFN | Multicast/broadcast over single-frequency network |
| MCH | Multicast channel |
| MIMO | Multiple input multiple output |
| MISO | Multiple input single output |
| MME | Mobility management entity |
| MOP | Maximum output power |
| MPR | Maximum power reduction |
| MU-MIMO | Multiple user MIMO |
| NAS | Non-access stratum |
| OBSAI | Open base station architecture interface |
| OFDM | Orthogonal frequency division multiplexing |
| OFDMA | Orthogonal frequency division multiple access |
| PAPR | Peak-to-average power ratio |
| PAR | Peak-to-average ratio |
| PBCH | Physical broadcast channel |
| P-CCPCH | Primary common control physical channel |
| PCFICH | Physical control format indicator channel |
| PCH | Paging channel |
| PDCCH | Physical downlink control channel |
| PDCP | Packet data convergence protocol |
| PDSCH | Physical downlink shared channel |
| PHICH | Physical hybrid ARQ indicator channel |
| PHY | Physical layer |
| PRACH | Physical random access channel |
| PMCH | Physical multicast channel |
| PMI | Pre-coding matrix indicator |
| P-SCH | Primary synchronization signal |
| PUCCH | Physical uplink control channel |
| PUSCH | Physical uplink shared channel. |

Figure 2:
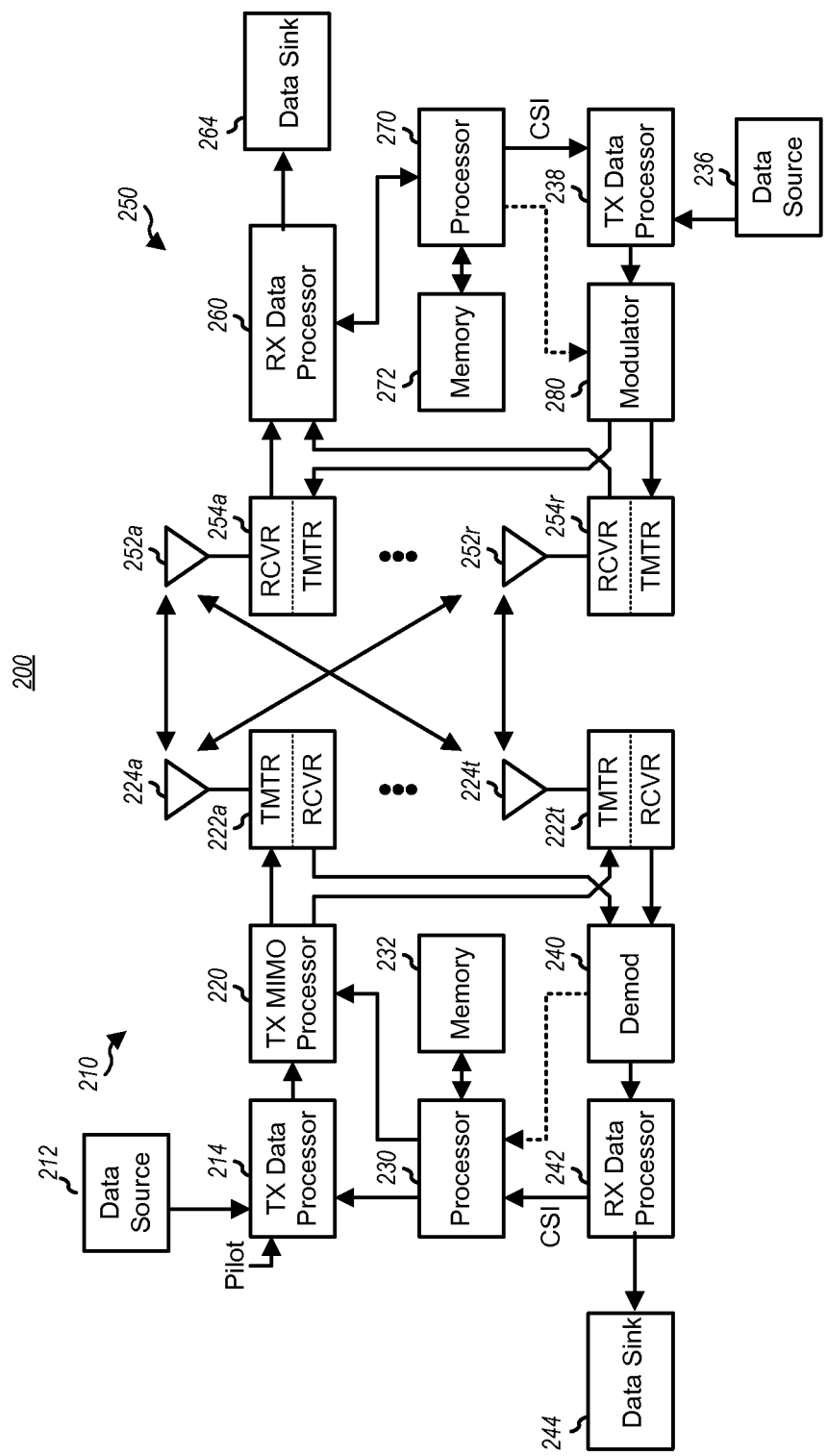
FIG. 2 illustrates a block diagram of a communication system.

FIG. 2 illustrates a block diagram of an exemplary communication system that may accommodate the various embodiments. The MIMO communication system 200 that is depicted in FIG. 2 comprises a transmitter system 210 (e.g., a base station or access point) and a receiver system 250 (e.g., an access terminal or user equipment) in a MIMO communication system 200. It will be appreciated by one of ordinary skill that even though the base station is referred to as a transmitter system 210 and a user equipment is referred to as a receiver system 250, as illustrated, embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2. At the transmitter system 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one embodiment, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples and may further processes the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

In some embodiments, a channel response estimate is generated by the RX data processor 260 and can be used to perform space/time processing at the receiver system 250, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI), which may include information regarding the communication link and/or the received data stream. This information, which may contain, for example, the operating SNR and other channel information, may be used by the transmitter system 210 (e.g., base station or eNodeB) to make proper decisions regarding, for example, the user equipment scheduling, MIMO settings, modulation and coding choices and the like. At the receiver system 250, the CSI that is produced by the processor 270 is processed by a TX data processor 238, modulated by a modulator 280, conditioned by the receiver system transceivers 254a through 254r and transmitted back to the transmitter system 210. In addition, a data source 236 at the receiver system 250 can provide additional data to be processed by the TX data processor 238.

In some embodiments, the processor 270 at the receiver system 250 may also periodically determine which pre-coding matrix to use. The processor 270 formulates a reverse link message comprising a matrix index portion and a rank value portion. The reverse link message may comprise various types of information regarding the communication link and/or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precoding matrices. Each of these precoding matrices can, in some instances, be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix. In some instances the feedback control signal also includes a rank index which indicates to the transmitter system 210 how many independent data streams to use in spatial multiplexing.

Other embodiments of MIMO communication system 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. These embodiments provide robustness and reliability of the communication channel. In transmit diversity systems each of the signals transmitted from the transmitter system antennas 224a through 224t will experience a different interference environment (e.g., fading, reflection, multi-path phase shifts). In these embodiments, the different signal characteristics received at the receiver system antennas 252a through 254r are useful in determining the appropriate data stream. In these embodiments, the rank indicator is typically set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t, are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions.

In other embodiments, a reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink 244.

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

A characteristic of wireless communication systems is the typically rapid and significant variations in the instantaneous channel conditions. For example, frequency selective fading can result in rapid and random variations in channel attenuation. Shadow fading and distance-dependent path loss can affect the average received signal strength. Additionally, transmissions to and from other terminal can cause interference at the receiver that degrades the signal-to-noise ratio at the receiver. These variations in channel quality can result in data errors at the receiver when the ratio of the energy per bit to the noise energy ($E_b/N_0$) is too low. Approaches to this problem include link adaptation and channel dependent scheduling to minimize errors and forward error correction and repeat retransmission requests to correct errors.

Link adaptation can use either dynamic transmit power control or dynamic rate control to maintain the received $E_b/N_0$ and data rate at a desired level. Dynamic transmit power control has been used in CDMA-based systems such as cdma2000 and WCDMA to compensate for varying channel conditions. The principle underlying dynamic power control is that power is increased when the channel quality is poor, and decreased when the channel quality is good. In dynamic rate control, as the name implies, the transmitted data rate is adjusted while keeping the transmitted power constant. The data rate is decreased when the channel quality is poor (increasing the energy per bit) and decreased when the channel quality is good (decreasing the energy per bit).

Channel dependent scheduling controls the allocation of shared resources among different mobile terminals within a transmission cell by the use of orthogonality. In the downlink from a cellular base station to multiple mobile terminals, the transmission may be orthogonal in the time domain (time-division multiplexing, or TDM), in the frequency domain (frequency-division multiplexing, or FDM) or in the code domain (code-division multiplexing, or CDM). Additionally, the spatial domain can also be used to separate users, at least in a quasi-orthogonal way, through the use of different antenna arrangements to achieve spatial division multiplexing (SDM). Separating users in time, in frequency, in code-space or physical space allows the transmitter to maximize or optimize transmissions to individual users based on the channel quality between the transmitter and each individual user.

While link adaptation and channel dependent scheduling seek to minimize errors, they cannot be 100% effective due to the random nature of interference and channel quality. Therefore, virtually all wireless communication systems employ some form of forward error correction (FEC). The basic principle underlying FEC is the introduction of redundancy in the transmitted signal, adding bits that are derived from the information bits in the signal using a particular coding algorithm, such as a cyclic redundancy check (CRC) code. At the transmitter side of the communication link, the algorithm is applied to the information bits and the result (FEC bits) is concatenated with the information bits. At the receiver side of the communication link, the algorithm (which is known by the receiver) is again applied to the information bits to generate a local result that is compared with the transmitted FEC bits. If the local result matches the transmitted FEC bits, then there is a high probability that the transmitted information was received and decoded without error. If the local result does not match the transmitted FEC bits, then there is a high probability that the transmitted information was not received and decoded without error. The level of certainty associated with the local result is related to the number of FEC bits. For example, a 16-bit CRC code has a probability of error equal to $2^{-16}$, or 1 in 65,536. Some sophisticated FEC schemes can use the comparison between the transmitted FEC bits and the local result to determine which information bits have been decoded incorrectly and to make corresponding corrections.

Another approach to handling transmission errors is to use an automatic repeat request (ARQ). In an ARQ scheme, the receiver uses an error detection code such as a CRC to detect if a reception error has occurred. If no error is detected, the receiver sends a positive acknowledgement (ACK) to the transmitter. However, if an error is detected, the receiver sends a negative acknowledgement (NACK). In response to a NACK, the transmitter retransmits the information.

Most contemporary wireless communication systems, including cdma2000, WCDMA and LTE Release 8 use a combination of FEC coding and ARQ known as hybrid ARQ (HARQ). Hybrid ARQ uses FEC codes to correct a subset of all errors and relies on error detection to detect uncorrectable errors. Erroneously received data packets are discarded and the receiver requests retransmission of corrupted packets.

A variation on HARQ is HARQ with soft combining HARQ with soft combining is based on the assumption that, even if a data packet was erroneously decoded, it still contains information. Accordingly, the erroneously decoded data packet is stored in a buffer memory and later combined with the retransmitted data to obtain a single, combined packet that is more reliable than its constituent parts.

HARQ is a stop and wait protocol. When a transmission has been made, the transmitting entity stops and waits until it receives an acknowledgment (ACK) or negative acknowledgement (NACK) back from the destination before transmitting the next block of data or retransmitting the same data block. In either case (ACK or NACK), the transmitting entity is required to schedule and process the next transmission in a specific time period.

For LTE Rel-8 frequency-division duplex (FDD), this time has been set to eight 1-ms subframes (the duration of a subframe is known as the transit time interval, or TTI). Since it only takes one subframe to transmit the data, this results in seven subframes of unutilized bandwidth. To fully utilize this bandwidth, LTE uses multiple HARQ parallel processes offset in time from each other. Each process transmits a block of data. By the time its next transmission allocation arrives, it will have already received the corresponding ACK or NACK from the receiving entity and created the next packet for transmission or retransmission.

For FDD, there are eight downlink HARQ processes. Downlink HARQ processes can be transmitted in any order without fixed timing (asynchronous HARQ). This means the UE receiver does not know ahead of time which HARQ process is transmitting in a given subframe, so the HARQ process identifier (HARQ ID) must be sent along with the data.

This is done through the physical downlink shared channel (PDSCH) resource allocation messages sent on a physical downlink control channel (PDCCH) simultaneously with the corresponding PDSCH transmission. A result of this scheme is that the scheduling algorithm has considerable freedom in deciding which UEs are sent data during any subframe.

The LTE Rel-8 specifications impose constraints on the UE and eNode B regarding the amount of time they have to complete the HARQ process. The UE receiver has three subframes to decode the transmission, check the CRC and encode the ACK/NACK. Assuming the transmitter sent the data in subframe n, the ACK/NACK must be sent back to the transmitter in subframe n+4.

The transmitter then has three subframes to decode the ACK/NACK returned from the UE receiver, construct the next transport block(s) based on the ACK/NACK and encode the transport block(s). The next transport block(s) are transmitted on this HARQ process in subframe n+8.

Figure 3:
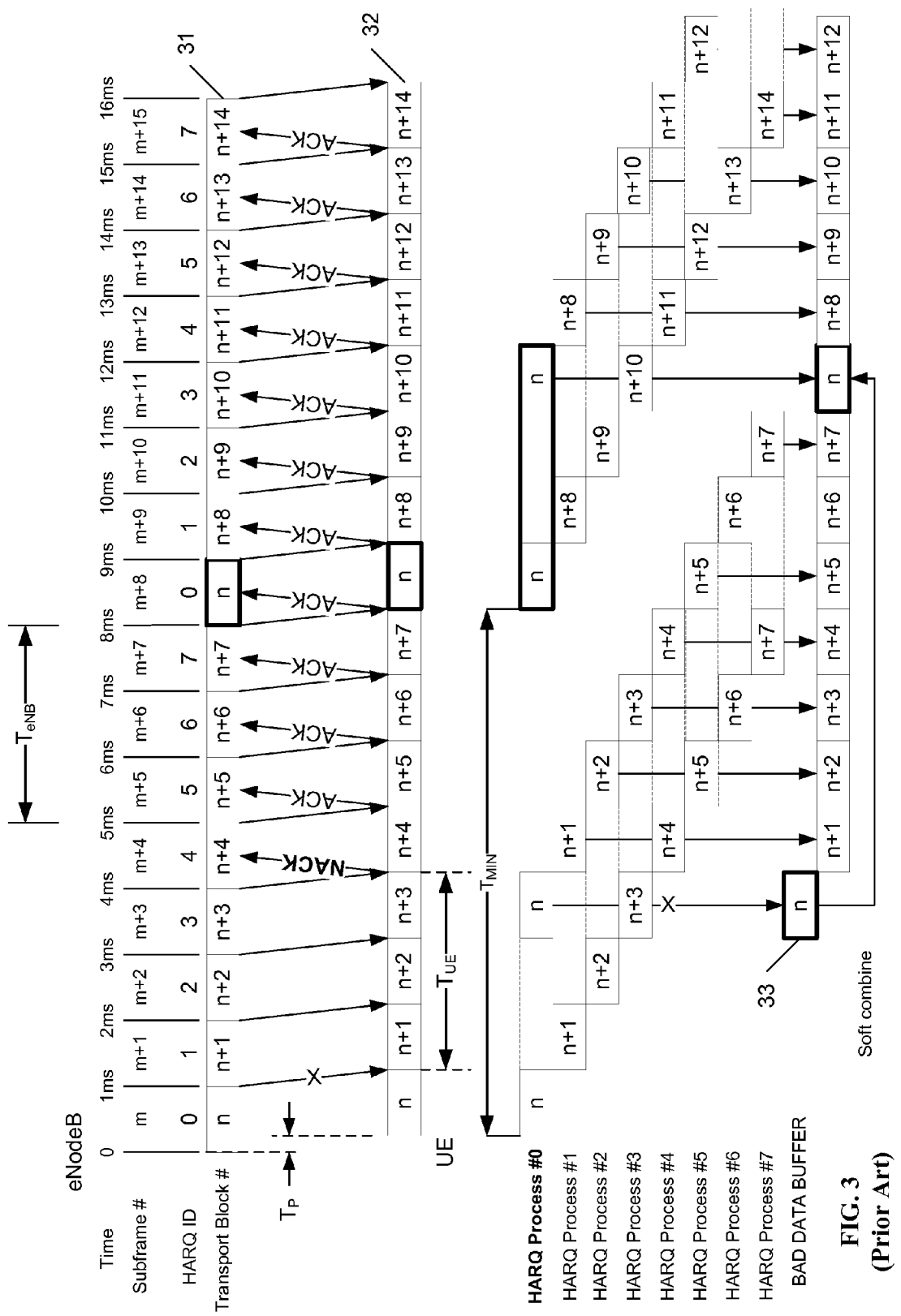
FIG. 3 is a timing diagram illustrating the operation of a conventional communication system.

FIG. 3 is a timing diagram illustrating communication between a base station (eNode B) and a mobile station (UE) in a system conforming to the 3GPP LTE-Rel 8 specification. As illustrated in FIG. 3, the base station transmit buffer 31 transmits a transport block during each 1 millisecond subframe. Transport block n is transmitted in subframe m, transport block n+1 is transmitted in subframe m+1, and so on. Each transport block is encoded with a HARQ process ID (HARQ ID) and FEC bits as described above. For convenience, the HARQ IDs, 0 through 7, are shown to be transmitted in sequence. However, there is no inherent requirement that the HARQ IDs be transmitted sequentially. As noted above, the only constraint imposed by the LTE Rel-8 specifications is that any particular HARQ ID cannot be repeated more often than once every 8 subframes (i.e., 8 milliseconds).

The transport blocks transmitted by the base station are received by the UE in a receive buffer 32 after a propagation delay T. After receiving each transport block, the UE decodes the HARQ ID for that block, and then has time interval $T_{UE}$ to process the block and to transmit an ACK or NACK to the base station. For LTE-Rel 8, $T_{UE}$ is 3 subframes (3 TTIs) long (3 ms). For example, transport block n, encoded with HARQ ID 0, is received in subframe m and processed in HARQ process #0. After time interval $T_{UE}$, the UE transmits a response at the end of subframe m+3. The example illustrated in FIG. 3 assumes that the UE detects a data error and responds with a NACK to request a retransmission of transport block n. The base station receives the NACK in subframe m+4 and has time interval $T_{eNB}$ to process the response. For LTE Rel-8, $T_{eNB}$ is also 3 subframes (3 TTIs) long (3 ms), so the base station retransmits transport block n with HARQ ID 0, in subframe m+8. The total time between the initial transmission of transport block n and the retransmission of transport block n in the same HARQ process (the inter-arrival time) is $T_{MIN}$ and requires 8 subframes (8 TTIs), so that $T_{MIN}$=8 ms.

As long as the UE decodes HARQ IDs correctly, this timing relationship holds true whether or not the UE detects a data error. For example, as illustrated in FIG. 3, the UE receives transport block n+1 in HARQ process #1 in subframe m+1 and, after detecting no errors, transmits an ACK to the base station at the end of subframe m+5. Three milliseconds later, the base station transmits new transport block n+8 in subframe m+9, 8 milliseconds after the transmission of transport block n+1. As illustrated in FIG. 3, this timing relationship is maintained for each of the eight HARQ processes, 0-7. FIG. 3 also illustrates the operation of soft combining, described above. When a transport block decoding error is detected, as in the case of transport block n in FIG. 3, the decoded data 33 is temporarily stored in a bad data buffer until transport block n is retransmitted and subsequently decoded in subframe m+11, when the original and retransmitted data can be combined.

Figure 4:
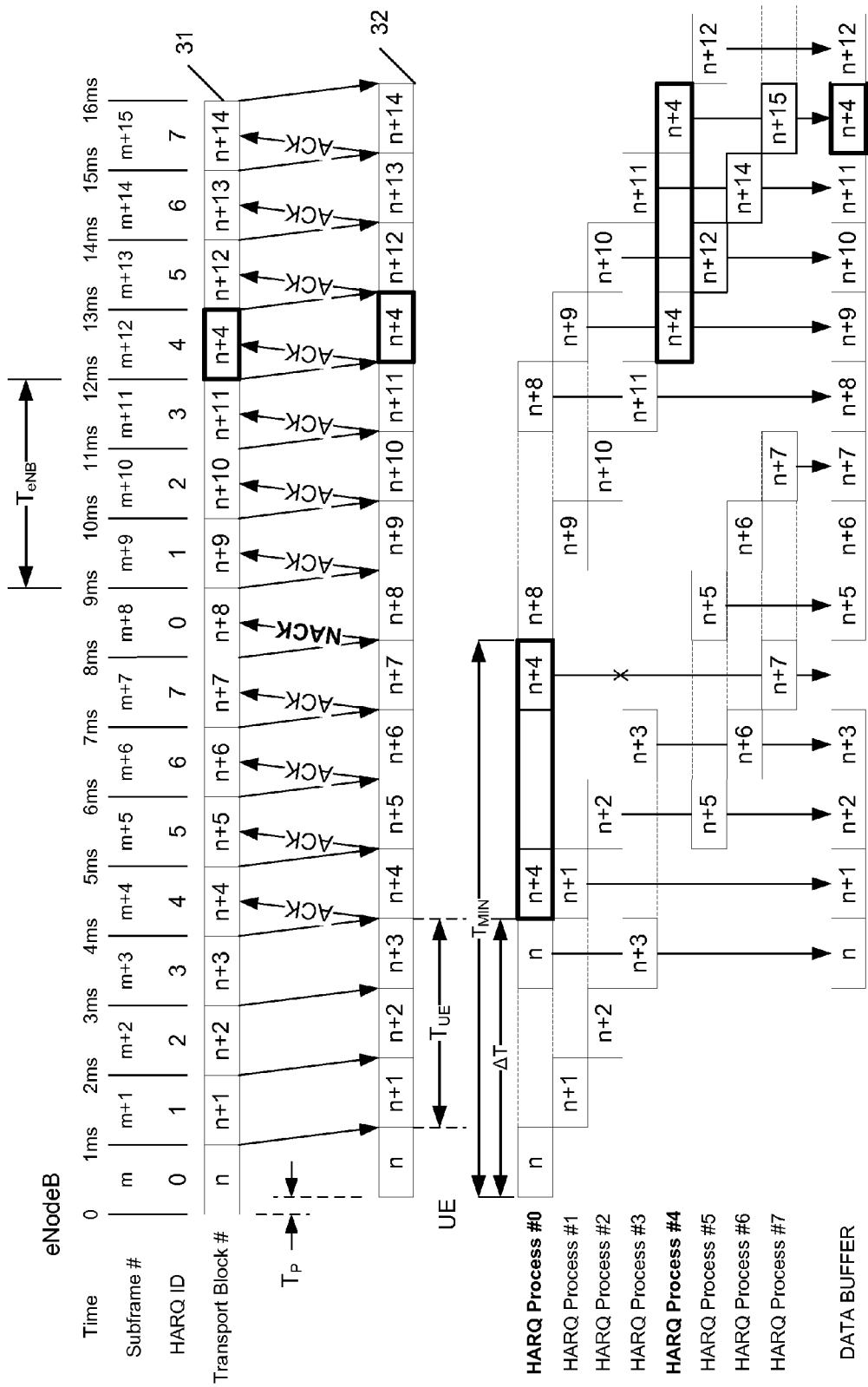
FIG. 4 is a timing diagram illustrating the operation of a communication system in one embodiment.

The timing described above depends on the correct decoding of HARQ IDs. However, as noted previously, there is a finite probability that a HARQ ID can be erroneously decoded without the detection of the error, causing a transport block to be processed in the wrong HARQ process. This situation is illustrated in FIG. 4, where it is assumed that the HARQ ID of transport block n+4 is erroneously decoded as HARQ 0 instead of HARQ 4. This is an undefined condition in LTE Rel-8, because the UE detects the repetition of a HARQ ID in a time interval $\Delta T$ that is less than the specified minimum inter-arrival time interval ($T_{MIN}$). As a result, the UE can behave in unpredictable ways, including crashing and/or losing communication with the base station.

Figure 5:
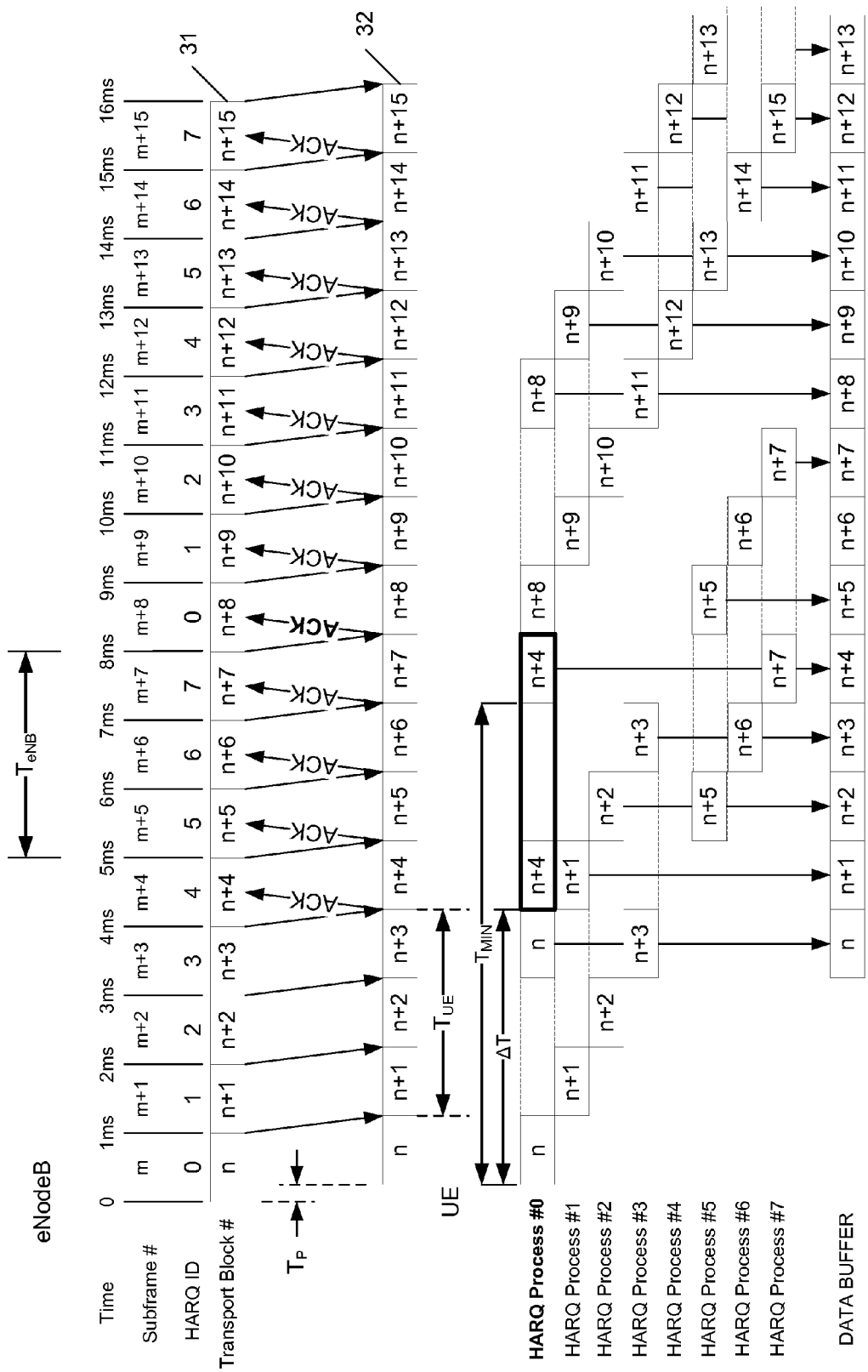
FIG. 5 is a timing diagram illustrating the operation of a communication system in another embodiment.

In one embodiment, therefore, a UE is configured to recover from a HARQ ID decoding error. If $\Delta T$ is less than $T_{MIN}$ but greater than or equal to $T_{UE}$+1 ms (i.e., $T_{UE}$ plus the duration of one subframe), then the processing of transport block n+4 in HARQ process #0 will not interfere with the processing of transport block n in HARQ process #0 or the subsequent processing of transport block n+8 in HARQ process #0. In one embodiment, as illustrated in FIG. 4, the UE may be configured to ignore the data in transport block n+4 and transmit a NACK to the base station in subframe m+8, causing the base station to retransmit transport block n+4 in subframe m+12. The n+4 transport block retransmitted in subframe m+12 will be encoded with HARQ ID 4, and be assigned to HARQ process #4 in the UE (if decoded without error), just as the original transmission should have been. Alternatively, as illustrated in FIG. 5, the UE is configured to recognize that the inter-arrival time $\Delta T$ between the first instance of HARQ ID 0 and the second instance of HARQ ID 0 is less than $T_{MIN}$ but greater than or equal to $T_{UE}$+1 ms, and to process transport block n+4 and save the data during subframe m+7, in which case the UE transmits an ACK to the base station in subframe m+8 and no data retransmission is required.

Figure 6:
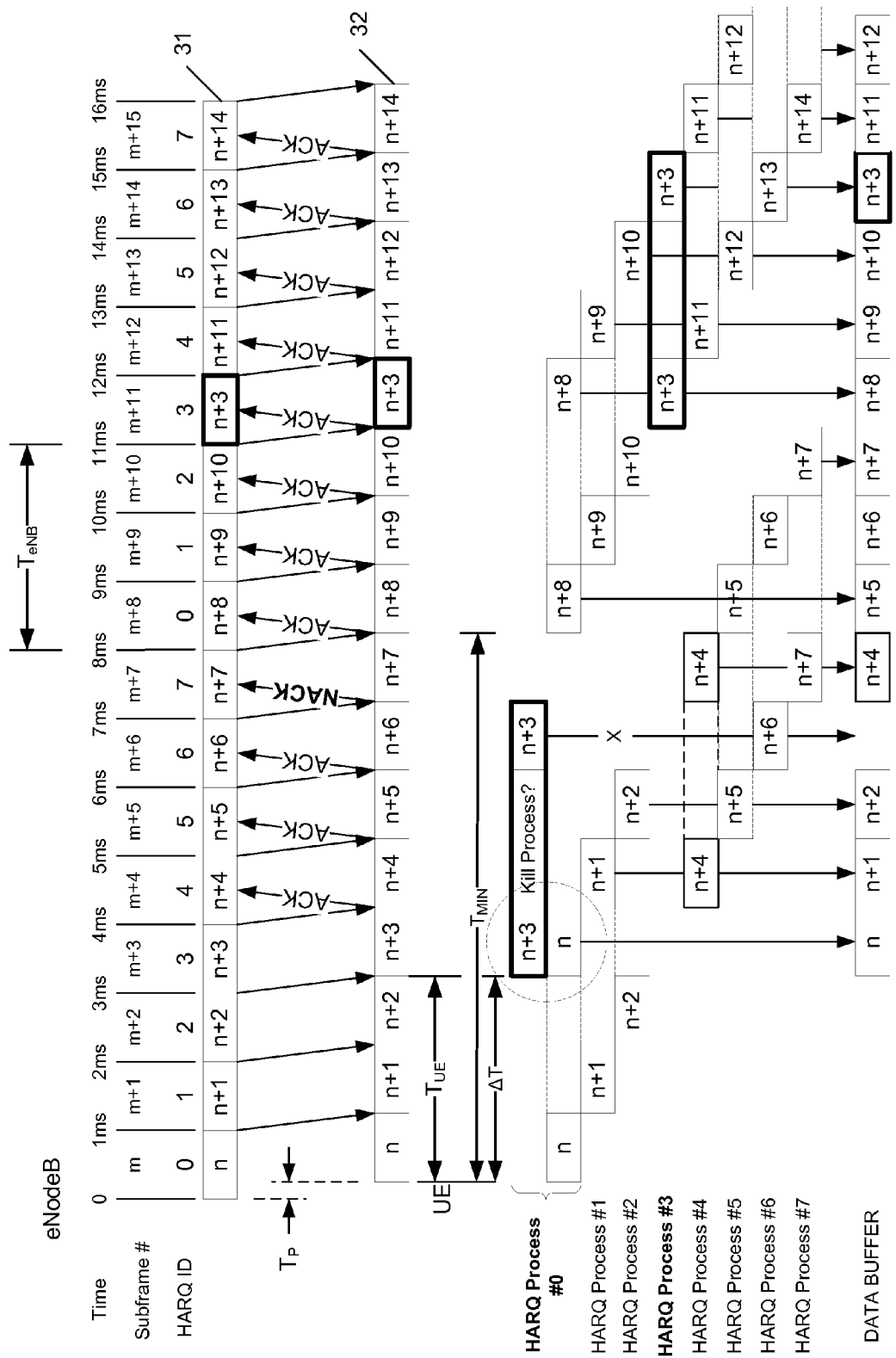
FIG. 6 is a timing diagram illustrating the operation of a communication system in another embodiment.

FIG. 6 is a timing diagram illustrating another embodiment, where $\Delta T$ is less than $T_{MIN}$ and less than or equal to $T_{UE}$. In FIG. 6, transport block n+3 is erroneously decoded to HARQ process #0 before the processing of transport block n is completed. In this embodiment, the UE is configured to recognize that the inter-arrival time between the first instance of HARQ ID 0 and the second instance of HARQ ID 0 is less than or equal to $T_{UE}$. In response, the UE may be configured to complete the processing of transport block n, kill the processing of transport block n+3, and transmit a NACK in subframe m+7 to request a retransmission of transport block n+3 in subframe m+11. The n+3 transport block retransmitted in subframe m+11 will be encoded with HARQ ID 3, and be assigned to HARQ process #3 in the UE (if decoded without error), just as the original transmission should have been.

Figure 7:
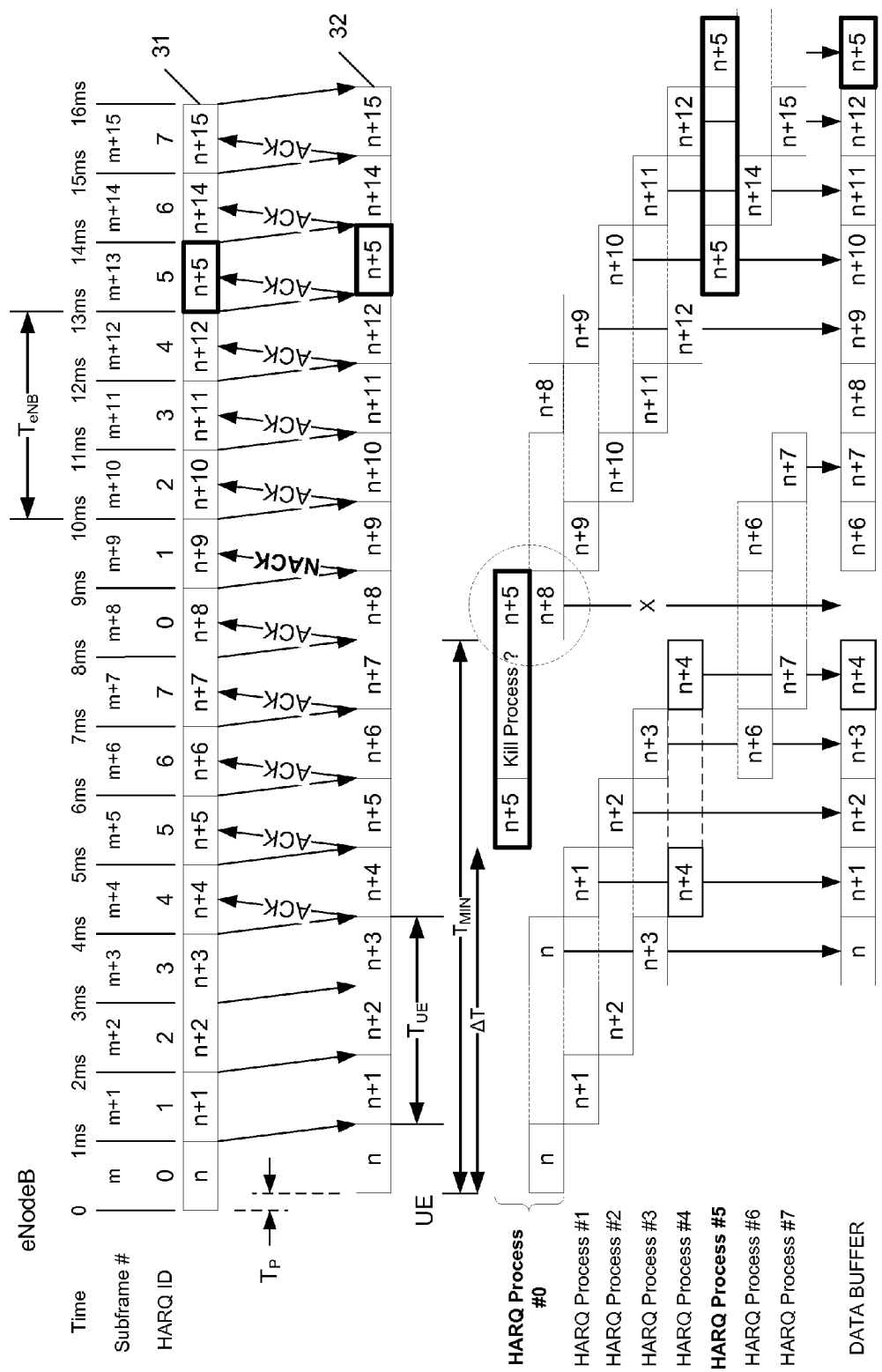
FIG. 7 is a timing diagram illustrating the operation of a communication system in another embodiment.

FIG. 7 is a timing diagram illustrating another embodiment, where ΔT is less than $T_{MIN}$ and greater than or equal to $T_{UE}$+2 ms (i.e., $T_{UE}$ plus the duration of two subframes). In FIG. 7, transport block n+5 is erroneously decoded to HARQ process #0 at subframe m+5. Processing of transport block n has completed, and processing of transport block n+5 can proceed without conflict, at least initially. However, as illustrated in FIG. 7, if another transport block is assigned to HARQ process #0 (either correctly or erroneously) at a time interval $T_{UE}$ after the assignment of transport block n, then a conflict arises. In this embodiment, the UE may be configured to kill the processing of transport block n+5 when HARQ ID 0 is decoded from transport block n+8, and transmit a NACK to the base station is subframe m+9. The n+5 transport block retransmitted in subframe m+13 will be encoded with HARQ ID 5, and be assigned to HARQ process #5 in the UE (if decoded without error), just as the original transmission should have been.

Figure 8:
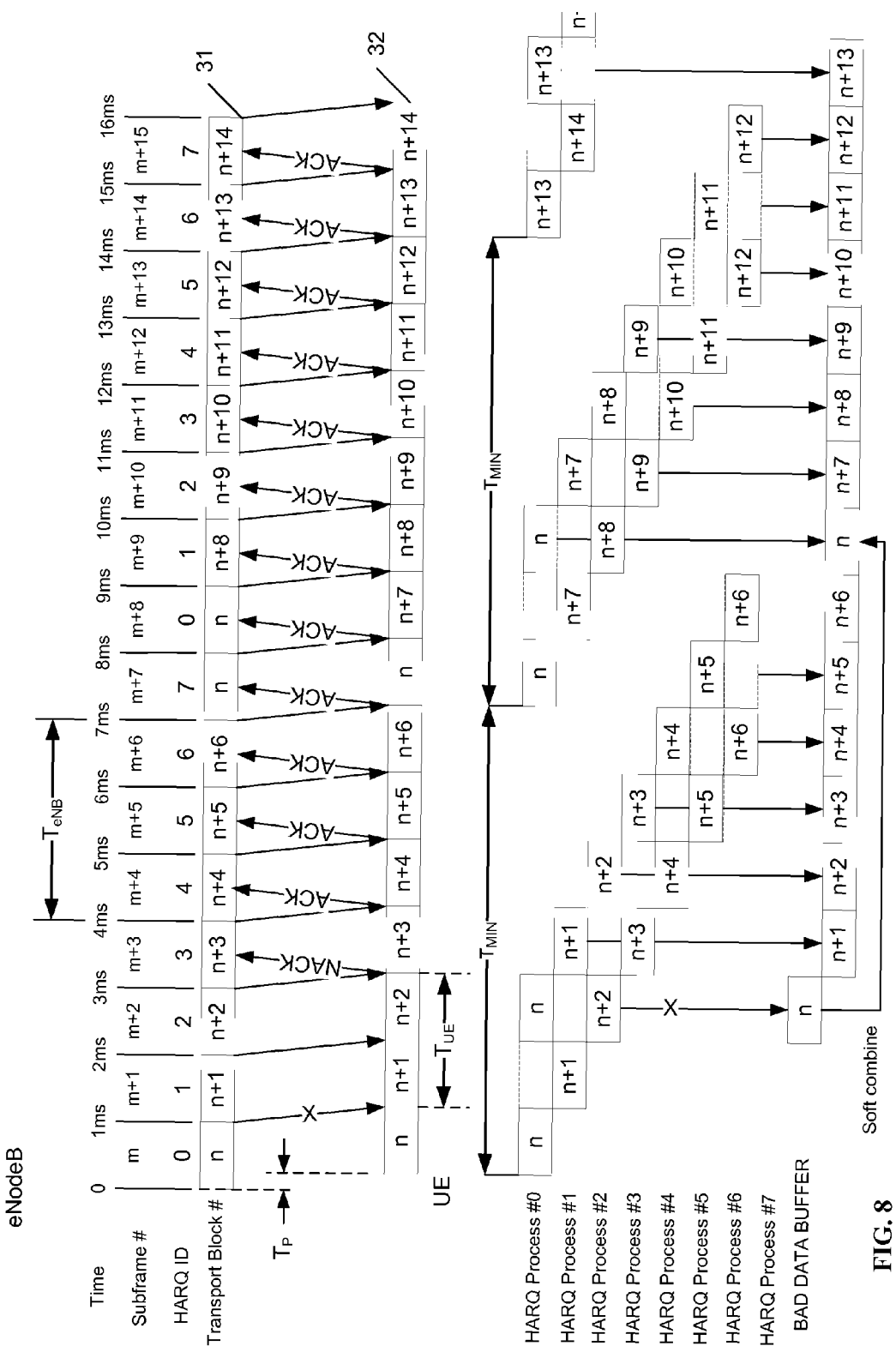
FIG. 8 is a timing diagram illustrating the operation of a communication system in another embodiment.

As described previously, the LTE Rel-8 specification constrains UEs to eight (8) HARQ Processes, which sets a lower boundary on the value of $T_{MIN}$ to eight (8) milliseconds, making no provision for variations in the processing capacity of individual UEs. Accordingly, in one embodiment, as illustrated by the timing diagram of FIG. 8, a UE with the capacity to process transport blocks at an accelerated rate may be configured to negotiate a reduced value of $T_{MIN}$ to increase data throughput. During setup, the UE may notify the base station of its processing capacity and receive a confirmation from the base station to reduce the value of $T_{MIN}$ based on that capacity. For example, as illustrated in FIG. 8, if the UE has the capacity to process transport blocks in two subframe time intervals instead of three, the number of TTIs required between an initial transmission of a transport block with a particular HARQ ID, and a transmission or retransmission of a transport block with the same HARQ ID can be reduced to 7 from the default value of 8. Additionally, it will be apparent to those skilled in the art that the various embodiments of error detection and correction described above may be implemented as well for a UE with accelerated processing capacity, when the respective time interval thresholds expressed in relation to $T_{UE}$.

Figure 9:
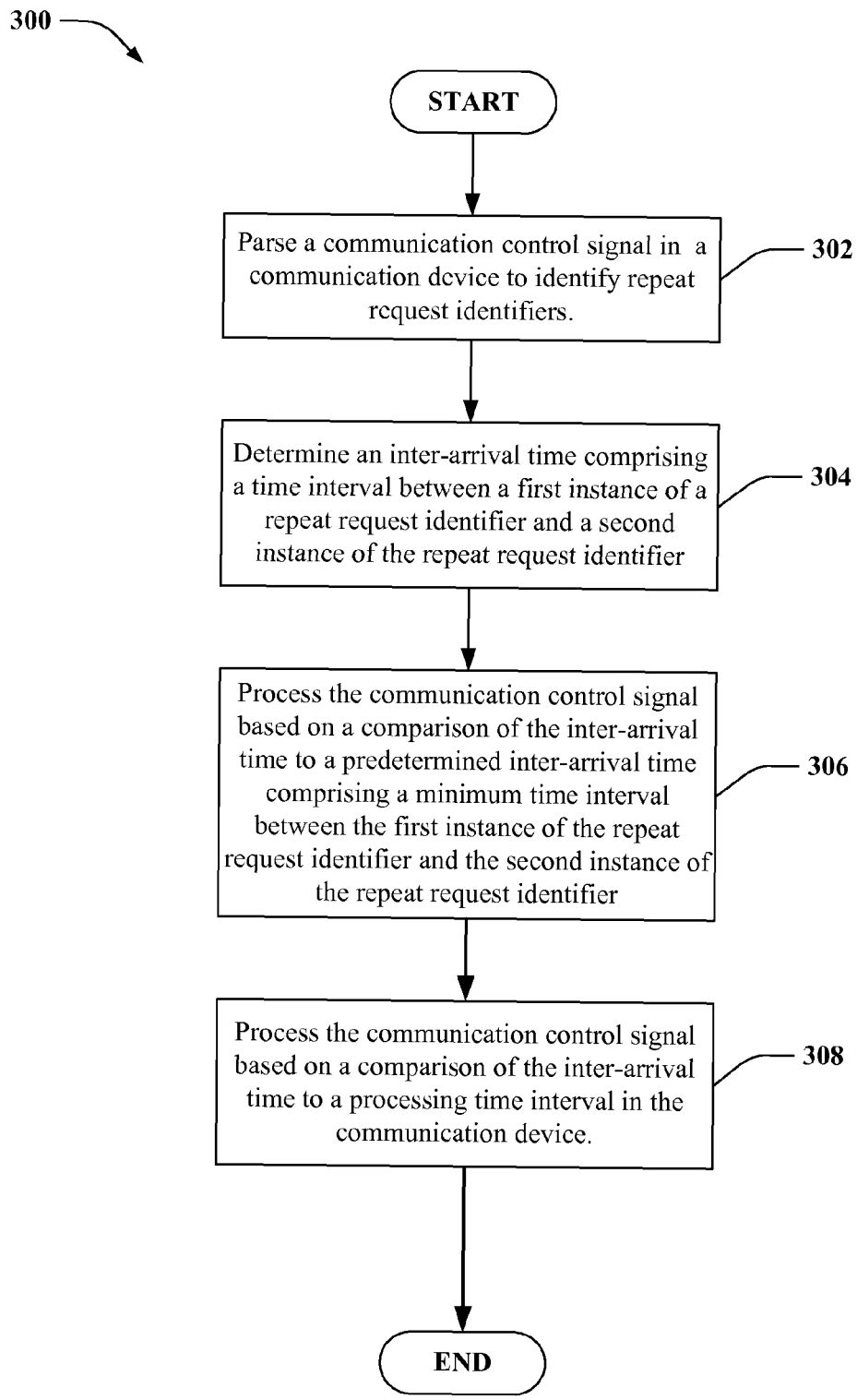
FIG. 9 is a flowchart illustrating the operation of one embodiment.

FIG. 9 is a flowchart illustrating a method 300 according to one provided embodiment. For purposes of simplicity of explanation, the method is shown and described as a series of operations. It is to be understood that the method is not limited by the order of operations, as some operations can, in accordance with one or more embodiments, occur in different orders and/or concurrently with other operations from that shown and described herein. For example, those skilled in the art will understand and appreciate that a method could alternatively be represented as a series of interrelated states or events, such as in a state diagram. Moreover, not all illustrated operations may be required to implement a method in accordance with one or more of the disclosed embodiment.

In FIG. 9, the method begins at operation 302, parsing a communication control signal (e.g., a PDCCH signal) in a communication device to identify repeat request identifiers (e.g., HARQ IDs). Operation 304 determines an inter-arrival time (e.g., ΔT) comprising a time interval between a first instance of a repeat request identifier and a second instance of the same repeat request identifier. Operation 306 processes the communication control signal based on a comparison of the inter-arrival time (e.g., ΔT) to a predetermined inter-arrival time (e.g., $T_{MIN}$). In one embodiment, method 300 further includes an operation 308, where the processing is further based on a comparison of the inter-arrival time (e.g., ΔT) to a processing time interval in the communication device (e.g., $T_{UE}$).

Figure 10:
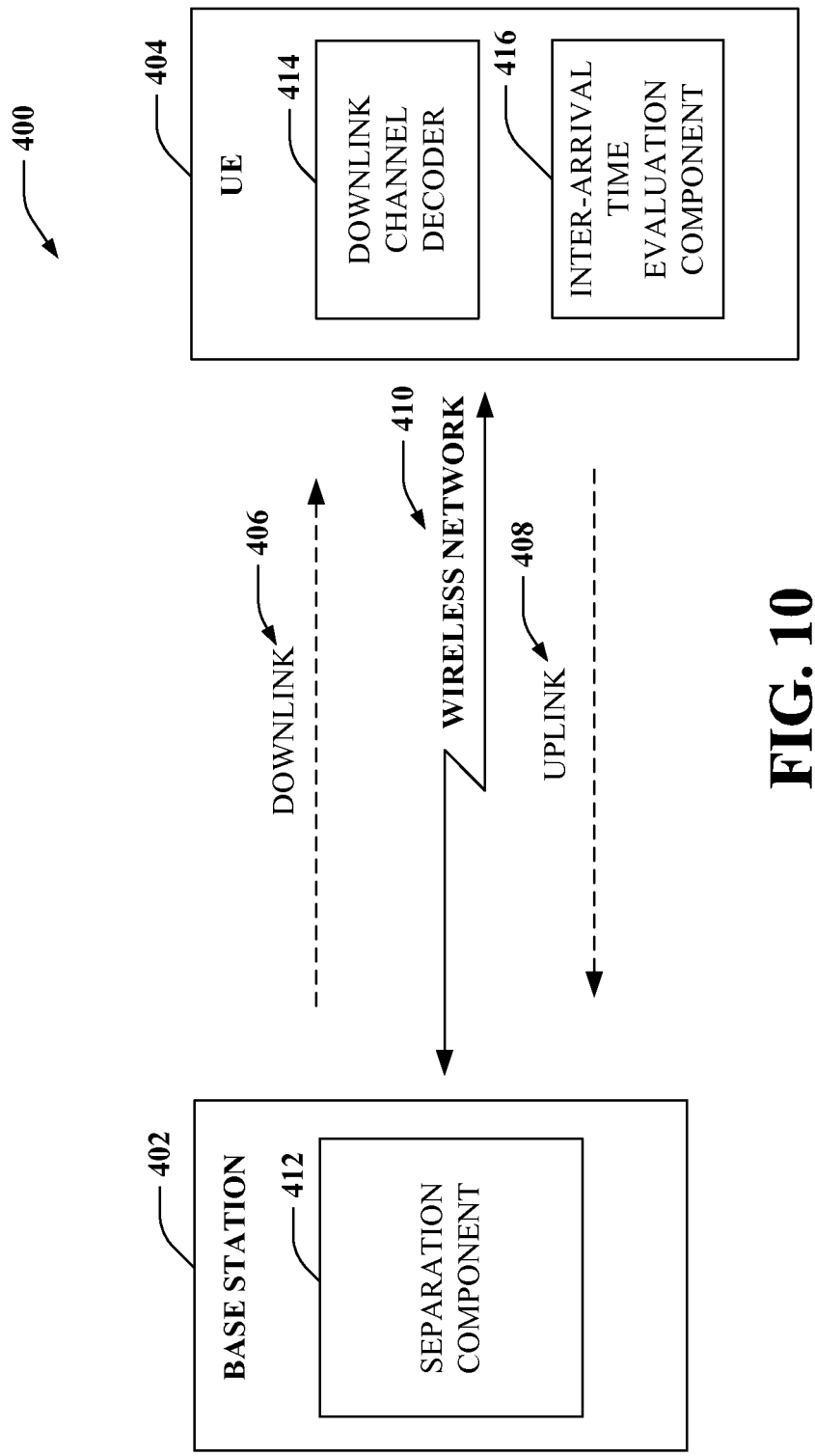
FIG. 10 illustrates a system within which various embodiments may be implemented.

FIG. 10 illustrates an exemplary system 400 capable of supporting the various operations described above. System 400 includes a base station 402 that can transmit and/or receive information, signals, data, instructions, commands, bits, symbols and the like. Base station 402 can communicate with a user equipment (UE) 404 via a downlink (forward channel) 406 and an uplink (reverse channel) 408 utilizing a wireless network 410. UE 404 can transmit and/or receive information, signals, data, instructions, commands, bits, symbols and the like. Moreover, although not shown, it is contemplated that any number of base stations similar to base station 402 can be included in system 400 and/or any number of UEs similar to UE 404 can be included in system 400.

Base station 402 may include a separation component 412 that can control the timing of hybrid automatic repeat request (HARQ) processes. Accordingly, separation component 412 can manage the timing of HARQ processes associated with the same HARQ identifiers (IDs) to ensure that HARQ processes with the same HARQ IDs are separated by at least a minimum time interval. Further, UE 404 can include a downlink channel decoder 414 and an inter-arrival time evaluation component 416. Downlink channel decoder 414 can decode a control channel. Thus, for example, downlink channel decoder 414 can decode a physical downlink control channel (PDCCH). Moreover, downlink channel decoder 414 can obtain HARQ IDs by parsing the PDCCH payload. Further, inter-arrival time evaluation component 416 can determine the inter-arrival time interval between the first reception of a HARQ ID and the second reception of the same HARQ ID and determine if an Acknowledgment (ACK) or Negative Acknowledgment (NACK) is to be transmitted by UE 404 to base station 402 in the uplink 408. By way of example, if inter-arrival time evaluation component 416 determines that the inter-arrival time for the repetition of a HARQ ID is less than a minimum inter-arrival time, then inter-arrival time evaluation component 416 can cause UE 404 to process or reject the second HARQ process depending on the value of the inter-arrival time.

Figure 11:
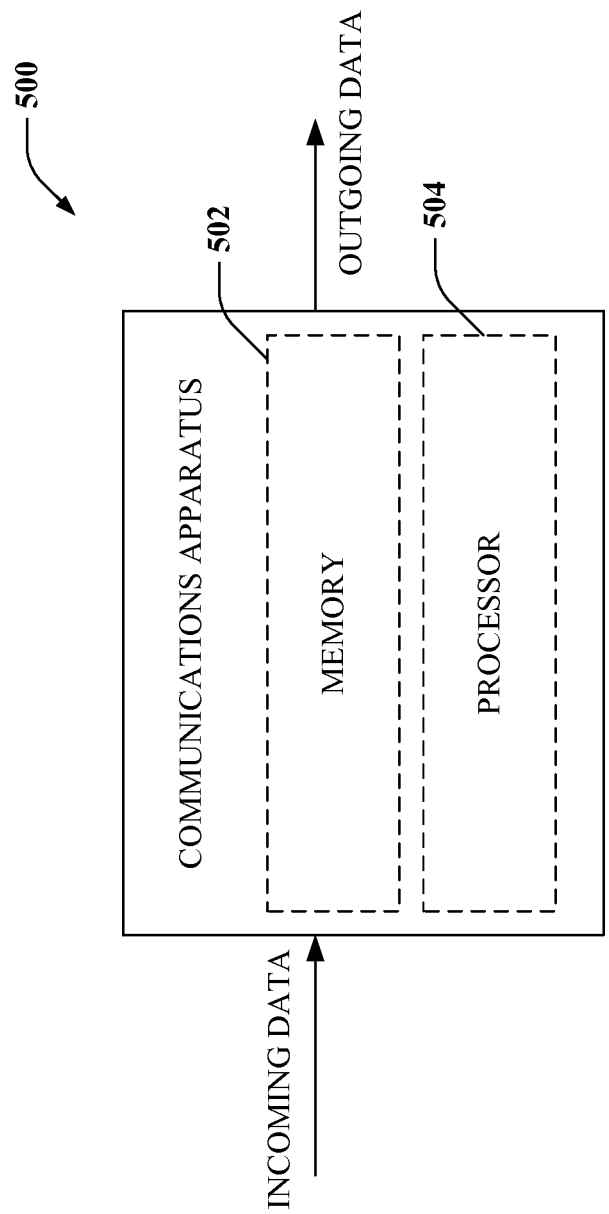
FIG. 11 illustrates an apparatus within which various embodiments may be implemented.

FIG. 11 illustrates an apparatus 500 within which the various disclosed embodiments may be implemented. In particular, the apparatus 500 that is shown in FIG. 11 may comprise at least a portion of a base station or at least a portion of a user equipment (such as the base station 402 and the user equipment 404 that are depicted in FIG. 10) and/or at least a portion of a transmitter system or a receiver system (such as the transmitter system 210 and the receiver system 250 that are depicted in FIG. 2). The apparatus 500 that is depicted in FIG. 11 can be resident within a wireless network and receive incoming data via, for example, one or more receivers and/or the appropriate reception and decoding circuitry (e.g., antennas, transceivers, demodulators and the like). The apparatus 500 that is depicted in FIG. 11 can also transmit outgoing data via, for example, one or more transmitters and/or the appropriate encoding and transmission circuitry (e.g., antennas, transceivers, modulators and the like). Additionally, or alternatively, the apparatus 500 that is depicted in FIG. 11 may be resident within a wired network.

FIG. 11 further illustrates that the apparatus 500 can include a memory 502 that can retain instructions for performing one or more operations, such as signal conditioning, analysis and the like. Additionally, the apparatus 500 of FIG. 11 may include a processor 504 that can execute instructions that are stored in the memory 502 and/or instructions that are received from another device. The instructions can relate to, for example, configuring or operating the apparatus 500 or a related communications apparatus. It should be noted that while the memory 502 that is depicted in FIG. 11 is shown as a single block, it may comprise two or more separate memories that constitute separate physical and/or logical units. In addition, the memory while being communicatively connected to the processor 504, may reside fully or partially outside of the apparatus 500 that is depicted in FIG. 1. It is also to be understood that one or more components, such as the separation component 412, the inter-arrival time evaluation component 416 and the downlink channel decoder 414 that are shown in FIG. 10, can exist within a memory such as memory 502.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 500 of FIG. 11 can be employed with a user equipment or mobile device, and can be, for instance, a module such as an SD card, a network card, a wireless network card, a computer (including laptops, desktops, personal digital assistants PDAs), mobile phones, smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to- user equipment) ad hoc network systems often using unpaired unlicensed spectrums, 802.xx wireless LAN, BLUETOOTH and any other short- or long- range, wireless communication techniques.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment (e.g. 404 FIG. 10). In the alternative, the processor and the storage medium may reside as discrete components in a user equipment (e.g., 404 FIG. 10). Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:
1. A method comprising:
   identifying, in a communication signal received by a communication device, a first instance of a repeat request identifier and a second instance of the repeat request identifier;
   determining an inter-arrival time comprising a time interval between the first instance of the repeat request identifier and the second instance of the repeat request identifier;
   comparing the inter-arrival time to a predetermined inter-arrival time to determine whether the second instance of the repeat request identifier is an incorrectly decoded instance of a different repeat identifier, the predetermined inter-arrival time comprising a minimum time interval between the first instance of the repeat request identifier and the second instance of the repeat request identifier; and processing the communication signal based at least in part on the different repeat identifier when it is determined that one of either the first instance of the repeat request identifier or the second instance of the repeat request identifier is the incorrectly decoded instance of the different repeat identifier, the processing including one of, acknowledging and processing data associated with the first instance of the repeat request identifier and ignoring data associated with the second instance of the repeat request identifier, or acknowledging and processing the data associated with the second instance of the repeat request identifier and ignoring the data associated with the first instance of the repeat request identifier.

2. The method of claim 1, further comprising processing the communication signal based on a comparison of the inter-arrival time to a processing time in the communication device.

3. The method of claim 1, further comprising negotiating with a base station the predetermined inter-arrival time interval based on a processing capacity of the communication device.

4. The method of claim 3, wherein the predetermined inter-arrival time is less than 8 milliseconds.

5. The method of claim 1, wherein the communication signal comprises a physical downlink control channel (PDCCH) signal in a third generation partnership project (3GPP) long term evolution (LTE) network.

6. The method of claim 1, wherein each of the first and second instances of the repeat request identifier comprises a hybrid automatic repeat request (HARQ) process identifier (ID) in a 3GPP LTE network.

7. A communication device, comprising:
a processor; and
a memory comprising processor executable instructions that, when executed by the processor, configures the communication device to:
identify in a communication signal received by the communication device, a first instance of a repeat request identifier and a second instance of the repeat request identifier;
determine an inter-arrival time comprising a time interval between the first instance of the repeat request identifier and the second instance of the repeat request identifier;
compare the inter-arrival time to a predetermined inter-arrival time to determine whether the second instance of the repeat request identifier is an incorrectly decoded instance of a different repeat identifier, the predetermined inter-arrival time comprising a minimum time interval between the first instance of the repeat request identifier and the second instance of the repeat request identifier; and
process the communication signal based at least in part on the different repeat identifier when it is determined that one of either the first instance of the repeat request identifier or the second instance of the repeat request identifier is the incorrectly decoded instance of the different repeat identifier, the process including one of,
acknowledging and processing data associated with the first instance of the repeat request identifier and ignoring data associated with the second instance of the repeat request identifier, or acknowledging and processing the data associated with the second instance of the repeat request identifier and ignoring the data associated with the first instance of the repeat request identifier.

8. The communication device of claim 7, wherein the processor executable instructions, when executed by the processor, further configures the communication device to process the communication signal in response to a comparison of the inter-arrival time to a processing time in the communication device.

9. The communication device of claim 7, wherein the processor executable instructions, when executed by the processor, further configures the communication device to negotiate with a base station the predetermined inter-arrival time interval based on a processing capacity of the communication device.

10. The communication device of claim 7, wherein the predetermined inter-arrival time is less than 8 milliseconds.

11. The communication device of claim 7, wherein the control signal comprises a physical downlink control channel (PDCCH) signal in a third generation partnership project (3GPP) long term evolution (LTE) network.

12. The communication device of claim 7, wherein each of the first and second instances of the repeat request identifier comprises a hybrid automatic repeat request (HARQ) process identifier (ID) in a 3GPP LTE network.

13. A computer program product, embodied on a non-transitory computer-readable medium, comprising:
program code for identifying in a communication signal received by a communication device, a first instance of a repeat request identifier and a second instance of the repeat request identifier;
program code for determining an inter-arrival time comprising a time interval between the first instance of the repeat request identifier and the second instance of the repeat request identifier;
program code for comparing the inter-arrival time to a predetermined inter-arrival time to determine whether the second instance of the repeat request identifier is an incorrectly decoded instance of a different repeat identifier, the predetermined inter-arrival time comprising a minimum time interval between the first instance of the repeat request identifier and the second instance of the repeat request identifier; and
program code for processing the communication signal based at least in part on the different repeat identifier when it is determined that one of either the first instance of the repeat request identifier or the second instance of the repeat request identifier is the incorrectly decoded instance of the different repeat identifier, the processing including one of,
acknowledging and processing data associated with the first instance of the repeat request identifier and ignoring data associated with the second instance of the repeat request identifier, or
acknowledging and processing the data associated with the second instance of the repeat request identifier and ignoring the data associated with the first instance of the repeat request identifier.

14. The computer program product of claim 13, further comprising:
program code for processing the communication signal in response to a comparison of the inter-arrival time to a processing time in the communication device.

15. The computer program product of claim 13, further comprising program code for:

negotiating the predetermined inter-arrival time interval with a base station based on a processing capacity of the communication device.

16. The computer program product of claim 13, wherein the predetermined inter-arrival time is less than 8 milliseconds.

17. The computer program product of claim 13, wherein the control signal comprises a physical downlink control channel (PDCCH) signal in a third generation partnership project (3GPP) long term evolution (LTE) network.

18. The computer program product of claim 13, wherein each of the first and second instances of the repeat request identifier comprises a hybrid automatic repeat request (HARQ) process identifier (ID) in a 3GPP LTE network.

* * * * *